United States Patent [19]

Mudge et al.

[11] 4,447,726

[45] May 8, 1984

[54] PASSIVE INFRARED INTRUSION DETECTOR

[75] Inventors: Philip H. Mudge, New Fairfield; William G. Kahl, Jr., Arrowhead Point, both of Conn.

[73] Assignee: Cerberus AG, Mannedorf, Switzerland

[21] Appl. No.: 369,228

[22] Filed: Apr. 16, 1982

[51] Int. Cl.$^3$ .............................................. G01J 1/00

[52] U.S. Cl. .................................... 250/342; 340/567

[58] Field of Search ............... 250/338, 340, 341, 342, 250/353; 340/567

[56] References Cited

U.S. PATENT DOCUMENTS 4,242,669 12/1980 Crick .................................. 250/342

4,321,594 3/1982 Galvin et al. ....................... 250/353

*Primary Examiner*—Janice A. Howell

*Attorney, Agent, or Firm*—Brumbaugh, Graves, Donohue & Raymond

[57] ABSTRACT

A passive infrared intrusion detector is provided of the type having an infrared sensor for detecting a change in temperature in the field of view of the sensor caused by an intruder moving therein, optical means for focusing radiation from the field of view on the sensor, and an alarm which is activated when the sensor detects a change in temperature. The improvements reside in mounting the passive intrusion detector in a generally C-shaped housing exposed to a field of view which may be shifted through an angle of at least 180°. A bendable, translucent window is provided having slots in opposite ends thereof which engage projections on opposite sides of the housing. The window is very simply released by applying thumb pressure to the window in the proximity of the projections. The intrusion detector is also provided with a horn-like enclosure which surrounds the sensor. A flexible Fresnel lens may be rapidly mounted on the enclosure, permitting ready adaptation of the detector to local conditions. Incorporated in the detector are a light source and movable mirror. The light source is mounted at a conjugate point with respect to the sensor so that the light source may be projected on the same field of view as that seen by the detector. This permits the detector to be easily and rapidly aimed.

15 Claims, 10 Drawing Figures

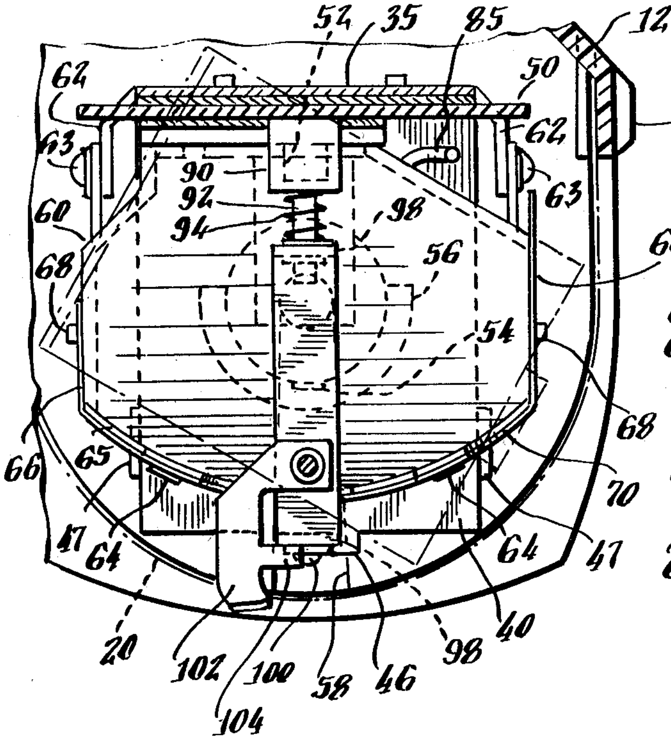
Fig. 6.
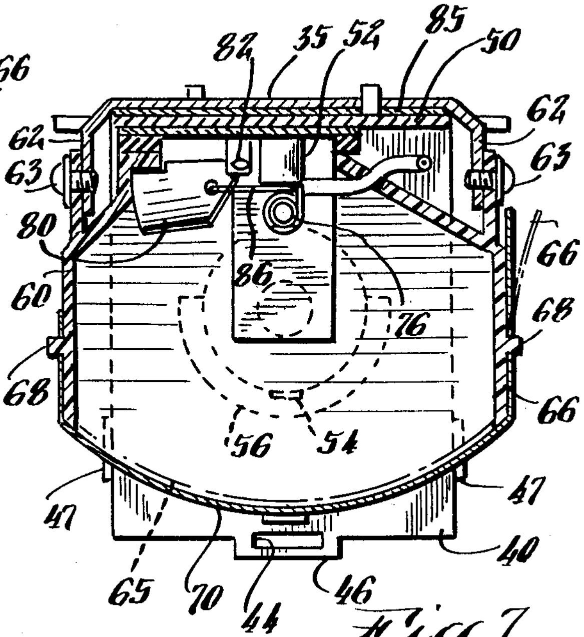
Fig. 7.
Fig. 8.
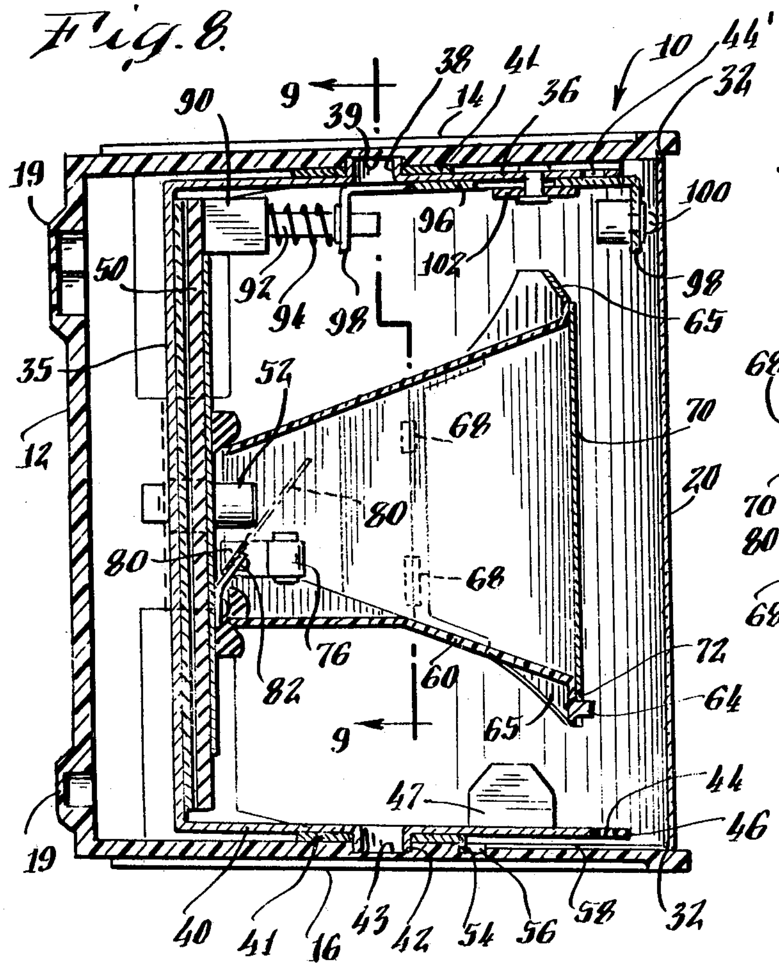
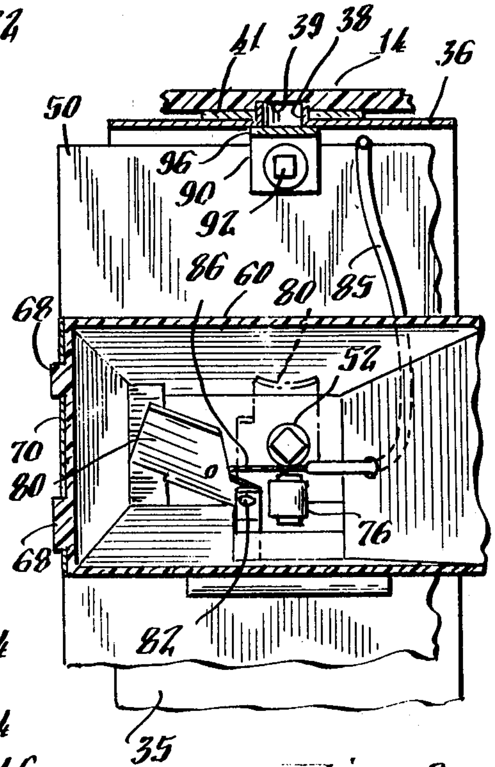
Fig. 9.

PASSIVE INFRARED INTRUSION DETECTOR

BACKGROUND OF THE INVENTION

This invention relates to a passive infrared intrusion detector of the type having a heat sensor, a lens for focusing radiation from a field of view guarded by the sensor and an alarm coupled to the sensor for providing an output when the sensor determines a change in temperature. More particularly, this invention relates to improvements in the aforesaid type of intrusion detector including the mounting and lateral aiming of the intrusion detector within the housing, a simplified window and lens mounting and removal structure, a readily removable chassis, a movable mirror which, in combination with a light source, serves to align and aim the intrusion detector, and a tamper switch and latch useful in the detection of tampering and the preliminary mounting and aiming of the device.

Passive intrusion detector systems have proven very useful in monitoring areas to detect intruders. An infrared detector is employed in such systems which detect radiation emitted by an object in the field of view such as an intruder. The system has no active source but relies on the radiation emitted by objects in the field of view of the detector. Of course, one of the problems with such a system is that it recognizes a change in temperature but cannot distinguish the source of that change in temperature. Thus, it may alarm upon change of temperature of a radiator, air vent, lamp, etc. Accordingly, the zones or areas which are to be protected by the intrusion detector must be carefully delineated and this is normally done by trial and error which is not only difficult but time consuming and expensive.

In U.S. Pat. No. 4,275,303 entitled "Passive Infrared Intrusion Detecting System", which is assigned to the assignee of the present invention, one method of dealing with this problem is disclosed. That method utilizes a lamp which emits visible light and is positioned within the intrusion detector near the sensor. Each lens segment has a distant and a near field portion. The light from the lamp passes through the lens in the direction of the zones to be protected by the detector, and the detector is adjusted until an observer can see the light from the lamp through one lens portion. The observer is then standing in a zone which is being observed by the detector through the other lens portion. Although this approach has been found to be useful, it has several shortcomings which include the fact that the detector and the lamp do not share a common field or view.

Another drawback with prior art units is that lenses (or focusing mirrors) are often integral parts of the unit. Thus it may be necessary for an installer to carry a large enough inventory to suit many different conditions of area dimensions and atmosphere. In addition, the mounting structure in which the intrusion detector is placed does not facilitate the removal of the window nor the positioning of the intrusion detector within the housing. In testing and set up it is desirable to be able to rapidly mount the housing for the intrusion detector and to be able to rapidly install or remove the intrusion detector system from its housing. This would allow the maximum flexibility in mounting and aiming the intrusion detector during installation.

SUMMARY OF THE INVENTION

Accordingly, it is an object of this invention to provide a new and improved passive infrared intrusion detector with capabilities for rapid installation and aiming.

A further object of this invention is to provide a new and improved passive intrusion detector which has readily interchangeable lenses.

Other objects, features, and advantages will be apparent from the following description and appended claims.

In carrying out this invention, in one illustrative embodiment thereof, a passive intrusion detector is provided of the type having an infrared sensor for detecting a change in temperature caused by an intruder moving in the field of view of the sensor, optical means for focusing radiation from the field of view on the sensor, and an alarm which is activated when the sensor detects a change in temperature in its field of view. The improvements include a generally C-shaped housing having the intrusion detector mounted in an opening between the top and bottom thereof. The detector is rotatably through an angle of 180°. A bendable, translucent window is provided having openings on opposite ends thereof adapted to engage projections on opposite sides of the housing. The window is released from the housing by simply applying thumb pressure to the window in the proximity of one of the projections. In addition, a movable mirror is positionable between the detector and a light source with the detector and light source being at conjugate points on opposite sides of the mirror. It is thereby possible to alternately expose either the light source or the sensor to the same field of view. An actuator for the movable mirror is positioned such that the mirror is automatically moved out of the way of the sensor when the window is positioned on the housing. Other features include: a flexible, snap-on lens; a chassis which is readily removable from the housing; and a tamper switch and latch for testing and also maintaining the integrity of the system against unauthorized tampering.

BRIEF DESCRIPTION OF THE DRAWINGS

The invention, together with further objects, advantages, features and aspects thereof will be more clearly understood from the following description taken in conjunction with the accompanying drawings.

FIG. 6 is a cross-sectional view taken substantially along the line 6—6 of FIG. 3.

FIG. 7 is a cross-sectional view taken substantially along the line 7—7 of FIG. 3.

FIG. 8 is a cross-sectional view taken substantially along the line 8—8 of FIG. 2.

FIG. 9 is a cross-sectional view taken substantially along the line 9—9 of FIG. 3.

DESCRIPTION OF THE PREFERRED EMBODIMENTS

The basic concept of a passive infrared intrusion detector including a heat sensor, a lens, and a circuit for generating an alarm when the sensor detects a change of temperature in its field of view is conventional and need not be described.

The present invention is related to novel aspects of construction which greatly simplify the tasks of mounting, aligning, and assembling such a detector. Accordingly, the invention is not restricted to any specific circuit details, type of alarm, or infrared detector which is utilized as long as that detector responds to infrared radiation.

Figure 1:
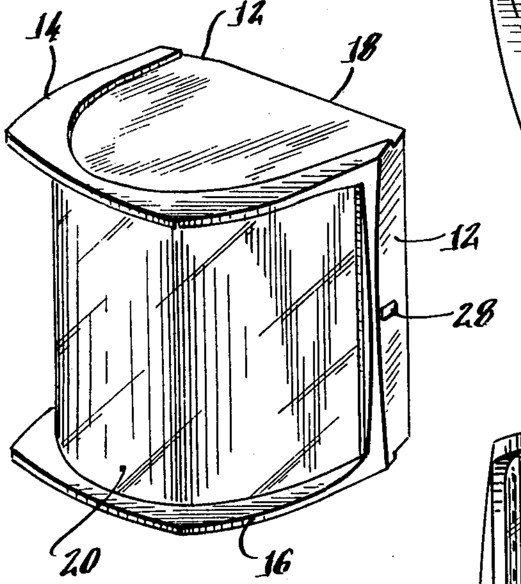
FIG. 1 is a perspective view of the new and improved passive intrusion detector with the window positioned thereon.
Figure 5:
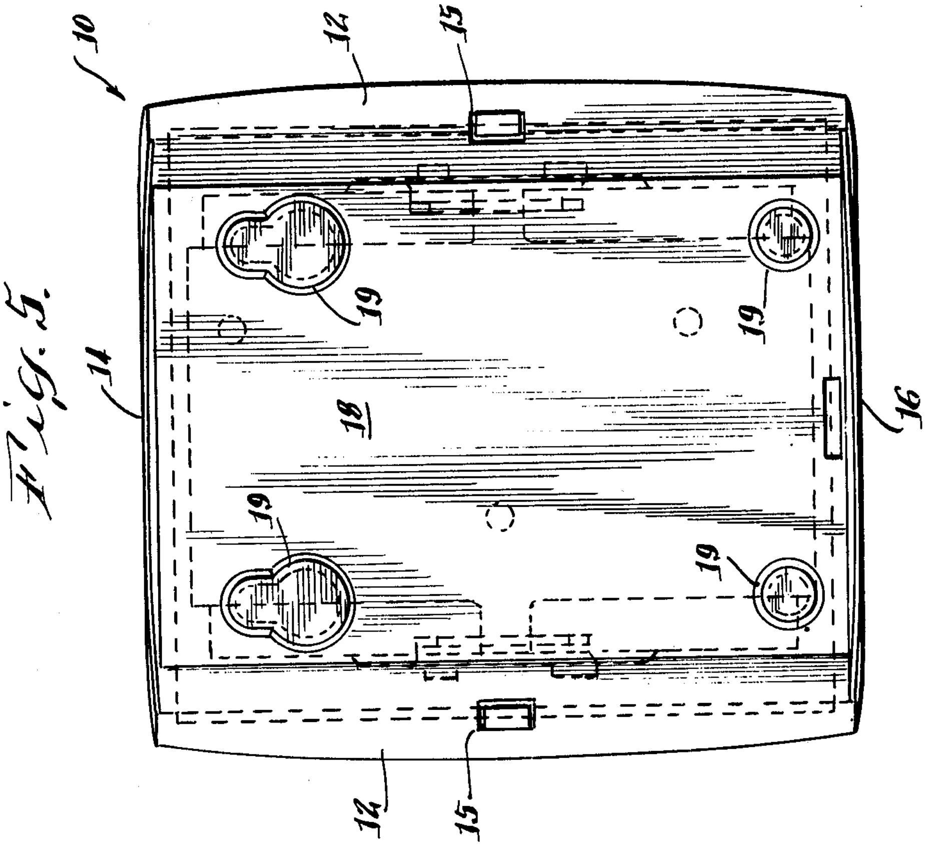
FIG. 5 is a rear view of the detector of FIG. 1.

Referring now to FIG. 1, the intrusion detector, referred to generally with the reference numeral 10, includes a generally C-shaped open housing 12 having spaced shelf-like top 14 and bottom 16 (see FIG. 5). Back 18 has a plurality of knock-outs 19 through which screws or other attachment means are utilized to mount the intrusion detector 10 on a wall or other surface.

The housing 12 includes narrow sidewalls 24 extending forwardly from the back 18 of the housing 12 as well as vertically between the top 14 and bottom 16, respectively. Paralleling each sidewall 24 are upper and lower ribs 28 and 29 which, with sidewalls 24, form guide channels 30 which are adapted to receive and position a window 20 over the front of the housing 12.

The window 20 is a bendable material of a suitable plastic, such as polyethylene, which is transparent to the desired wavelength of infrared radiation. The window 20 has a rectangular slot 22 in each end. (See FIG. 2). Cooperating lugs or projections 15 extend inwardly from the sidewalls 24 of the housing 12 to engage the slots 22 of the window 20. The inner surfaces of top 14 and bottom 16, respectively, of the housing 12 are provided with semicylindrically shaped flanges 32 and provide an arcuate track or path to act as a guide for wrapping the bendable window 20 over the housing 12.

In mounting the window 20 on the housing 12, one end of the window 20 is inserted in a channel 30 formed by the ribs 28 and 29 and one sidewall 24. The slot 22 in the end of the window is engaged by the lug 15. The window is bent around the annular flanges 32 on top 14 and bottom 16 and its other end is inserted in the channels 30 on the opposite side and the other slot 22 is engaged by corresponding lug 15. The window 20 is thus quickly positioned and mounted on the housing 12. To remove the window simply requires thumb pressure on the ends of the window to release the slots from the lugs. The window 20 is then pulled away. The whole operation takes a matter of seconds.

As will best be seen in FIG. 8, the intrusion detector 10 has a C-shaped chassis 35 having an upper leg 36 from which projects a small hollow post 38 which is adapted to fit into a centrally positioned well 39 in the top 14 of the housing 12. Similarly, the lower leg 40 of the C-shaped chassis 35 has a hollow circular post 42 which fits in a similar well 43 in the bottom 16 of the housing 12. The lower leg 40 also has a slot 44 (see FIG. 7) in a forwardly projecting tongue 46. A similar slot 44' is positioned in the upper leg (see FIG. 4). A tool, such as a screwdriver, may be inserted in slot 44 or 44' for removing the base 35 from the housing with the aid of upward projecting ears 47. Foam pads 41 surround the hollow posts 38 and 42. A circuit board 50 carrying the circuitry, as well as an infrared detector 52, is mounted to the chassis 35.

The lower leg 40 also includes a downwardly extending projection 54 which is free to move in a semicircular channel 56 in housing bottom 16. In addition, both the top 14 and bottom 16 of the housing 12 define shallow channels 58 (see FIGS. 2 and 6) which serve as guides for the insertion of the C-shaped chassis 35 into the C-shaped housing 12.

The chassis 35 carrying the circuit board 50 and other components of the intrusion detector 10 is mounted in the housing 12 by aligning the upper and lower posts 38 and 42 with the channels 58 and pushing the chassis 35 into the housing 12. When the posts 38 and 42 enter their cooperating wells 39 and 43, respectively, the chassis 35 is mounted in the housing with the projection 54 extending into semicircular channel 56. This permits the rotation of the detector 52 through a full 180° which is extremely useful in aiming the intrusion detector 10 laterally. When it is desired to disassemble the intrusion detector 10, the chassis 35 is removed from the housing 12 by inserting a tool, such as a screw driver, in the slot 44 of the tongue 46 projecting from the lower leg 40 of chassis 35, and simply prying outward. This releases the chassis 35 from the housing 12. Thus, the entire unit may be readily inserted or removed from the housing in very short order. Removal of chassis 35 from the housing 12 facilitates permanent mounting of the housing using the knock-outs 19 in the back. With this arrangement, a compact, firmly mounted unit is achieved. Once the housing 12 is mounted, the chassis 35 carrying the system components is readily put into place.

Figure 2:
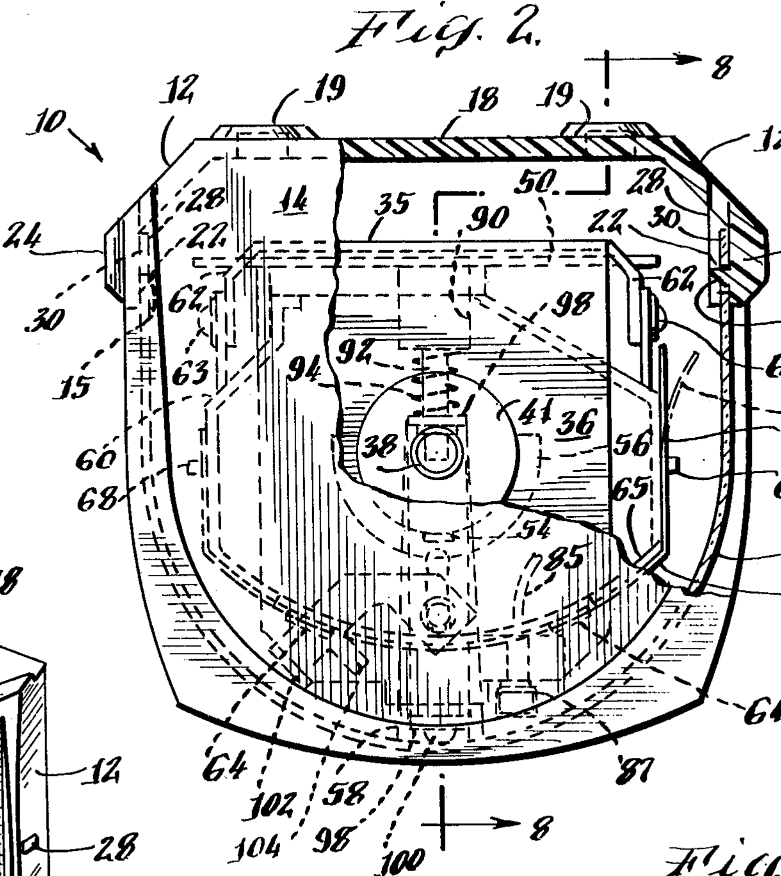
FIG. 2 is a top view of the detector of FIG. 1 with a portion of the housing broken away and in section.

As will best be seen in FIGS. 2 and 6, a hornlike enclosure 60 is mounted to arms 62 extending from the chassis 35 by screws 63. This permits rotation about screws 63 so that the enclosure may pivot up and down. As will be seen in FIG. 8, the enclosure 60 has a truncated end surrounding the infrared detector 52 so that the pivoting of the enclosure permits the detector 52 to be aimed up and down while rotation of the entire chassis 35 in the housing 12 permits the detector to be aimed laterally through 180°.

Figure 3:
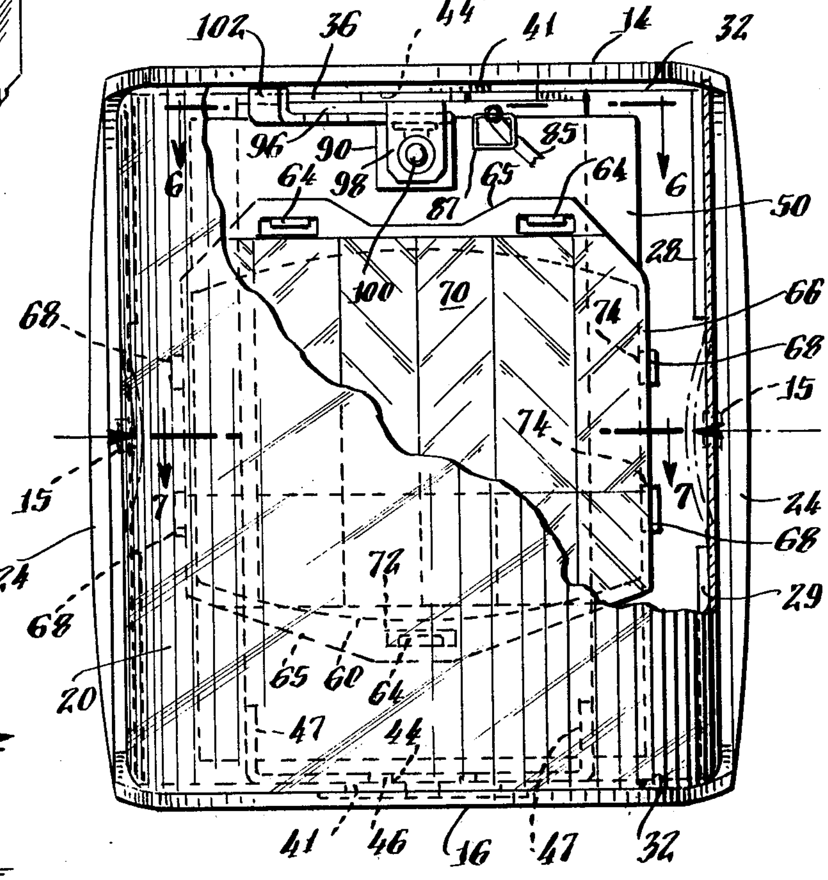
FIG. 3 is a front view of the detector of FIG. 1 with a portion of the window broken away.

As will best be seen in FIG. 3, the enclosure 60 carries a plurality of ridge projections 64 extending outwardly from its large front face 65 which is curved, as is illustrated in FIG. 6. The sides 66 carry a plurality of ears 68. This structure is adapted to receive and mount thereon a flexible Fresnel lens 70, having a plurality of lens segments as disclosed in the aforesaid patent. The lens focuses radiation from the field of view on the infrared detector 52. The lens 70 has openings 72 in the upper and lower margins thereof which are adapted to fit on the projections 64 of the enclosure 60. The ends of the lens 70 have slightly larger openings 74 therein which fit over the ears 68 on the sides 66 of the enclosure 60.

In operation the lens 70 may be readily mounted on the enclosure 60 simply by placing the openings 74 in the lens over the ears 68 of the enclosure and pulling the lens over the curved front face 65 of the enclosure where the openings 72 on the upper and lower portions of the lens capture the projections 64. The openings on the other end of the lens 70 are then hooked over the ears 68, and the lens is mounted on the enclosure. Removal is accomplished simply by lifting the lens off the ears. Of course, one benefit of this structure is that different lens systems may be used simply by removing one lens, and then replacing it with another lens which may define different fields of view or protective zones.

To aid in the aiming of the intrusion detector order to establish the zones or areas covered, a light source 76 (FIG. 8) in the form of a lamp, light emitting diode (LED) or other suitable source which emits visible radiation is mounted on the circuit board 50 at a 90° angle with respect to the infrared detector 52. A movable mirror 80 is mounted by a pivot 82 to the circuit board 50. A wire 88 reciprocatably mounted in a plastic tube 85 is connected by one end 86 to the mirror 80. The other end is formed into a finger grip 87. Using the grip, the wire may be pushed or pulled to move mirror 80 into and out of a position making a 45° angle between the infrared detector 52 and the light source 76. The front surface of the mirror 80 is reflective and when in position between the light source and infrared detector reflects the light from the source 76 out into the field of view of the intrusion detector 10. Since the infrared detector 52 and the light source 76 are located at conjugate points on opposite sides of the mirror, when the mirror 80 is removed the detector 52 sees the same field of view. This provides a perfect way of determining the field of view of the infrared detector 52. By actuating wire 88, the movable mirror 80 is pivoted about pivot point 82 to place the mirror between the infrared detector 52 and the light source 76. By turning on the light source and walking in front of the detector, an observer will see the light when he is in the field of view. The intrusion detector 10 may be aimed and aligned to cover the area desired to be protected. When the desired alignment is completed, the finger grip 87 is pushed in, removing the mirror from in front of the detector.

Figure 4:
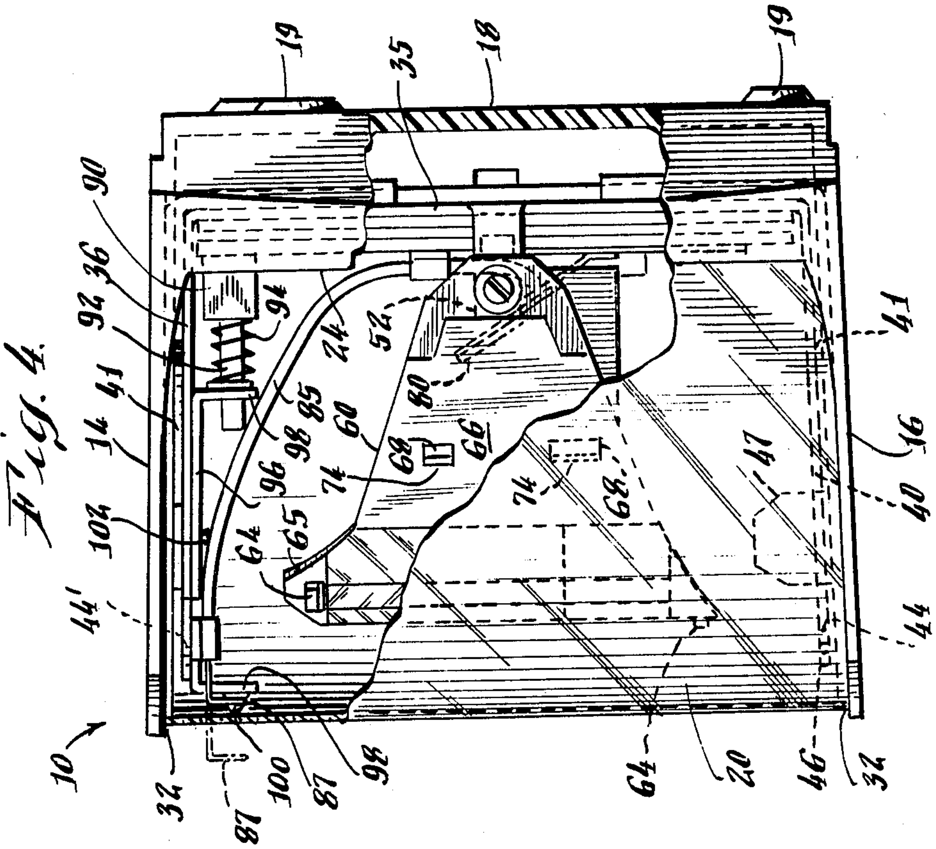
FIG. 4 is a side view of the detector of FIG. 1 with a portion of the window and housing away.

As will be seen in FIG. 4 when the wire 88 is pulled out it extends beyond the window 20 and the mirror 80 blocks the infrared detector 52. Thus, when the window 20 is mounted on housing 12, the window will automatically depress the wire which insures that the mirror 80 will not block the sensor 52 when the intrusion detector is set for monitoring a field of view.

As will best be seen in FIG. 4, a tamper switch 90 is actuated by a rod 92 which is urged outwardly by a spring 94. A U-shaped link 96 is reciprocably mounted with one leg 98 positioned to move the push rod 92 against the spring 94 to actuate the switch 90. The other leg 98 has a light source 100, such as an LED mounted thereon. When the unit is in operation, light from source 100 is visible through window 20. Normally, in the absence of window 20, light source 100 extends beyond the periphery of the semicircular annular flange 32 on which the mounted window 20 rests. However, when the window 20 is properly positioned in the housing 12, it bears against the source 100, thereby depressing the link 96 and its interconnected push rod 92 to actuate the switch 90 into an off position. If the window is removed by an intruder or unauthorized person, the spring 94 pushes the arm 96 outward, closing the switch 90 to activate light 100 and to give an alarm or other signal of tampering.

As will best be seen in FIGS. 3 and 6, a pivotal latch 102 is provided with an arm 104 projecting therefrom which is adapted to bear against the leg 98 and hold switch 90 in an open position. The use of the latch 102 facilitates the testing of the intrusion detector 10 to prevent gain change while tests are in progress. Under most circumstances, the latch 102 is released and when the window 20 is positioned on the housing it depresses and shuts off the tamper switch.

The tamper switch 90 serves three functions which are to initiate an alarm when the window 20 is removed; to light the LED 100 when the window 20 is removed and to turn it off when the window is replaced; and to provide a decrease in gain when the window is removed. The gain change is desirable in setting up and testing the unit because the window attenuates the radiation passing therethrough i.e., if the window has a 50% attenuation then the effective sensitivity is doubled when the window 20 is removed e.g., during installation and testing. In accordance with an aspect of the present invention, when the cover 20 is removed, switch 90 moves to a second position which reduces the gain of the system approximately ½ of normal (approximating the attenuation of the window). Accordingly, there is no change in sensitivity in the system when the window is on or off and the unit 10 provides accurate walk test results.

Figure 10:
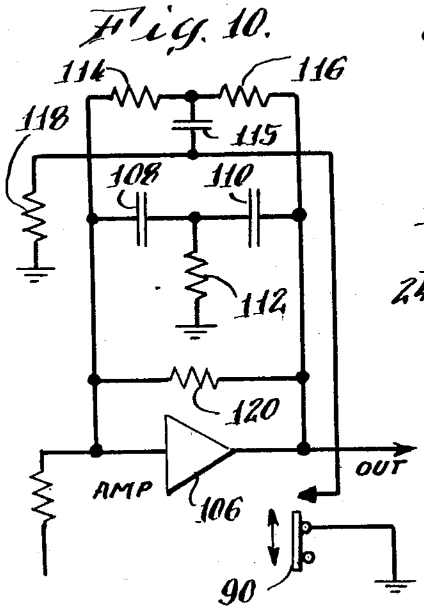
FIG. 10 is an electrical schematic diagram of gain change circuit which may be employed in the present invention.

FIG. 10 illustrates an example of one form of gain change circuit which may be used. The basic circuit elements include an amplifier 106, capacitors 108, 110 and 115 and resistors 114, 116, 118 and 120. When switch 90 is in the position shown on the drawing (window off), the series combination resistors 114 and 116 appear across resistor 120. If the combination resistance of resistor 114 and 116 approximate the resistance of resistor 120, then gain of amplifier 106 has been effectively cut in half.

When the switch 90 is moved up (window on) then elements 114, 116, 118 and 115 are virtually ineffective since the negative side of capacitor 115 is grounded by switch 90. Resistor 114 and 116 would provide slight additional loads on the input and output, respectively. The positive side of capacitor 115 presents a ground point to resistors 114 and 116 for AC signals. Resistor 118 maintains a high resistance ground path for capacitor 115 to enable it to hold a charge while switch 90 is open. If this is not provided, the discharged capacitor would cause the circuit to unbalance when the switch is closed as it charges up possibly causing the system to issue an alarm. The circuit is designed so that circuit balance is not affected when the switch changes positions.

The gain change circuit can be held in full gain even with the window 20 off by actuating the latch 102 which holds switch 90 open. This may be desirable in checking the environment for potential causes of false alarms during installation and testing. With the latch 102 engaging the switch 90 the sensitivity is increased by a factor of two making the system more sensitive to potential problems. When testing is completed the latch 102 is disengaged and the window 20 is replaced.

As has been described, an intrusion detector is provided with flexibility and adaptability in mounting, positioning and area coverage. The window may be rapidly mounted or removed from the housing. Similarly, the entire intrusion detector can be rapidly removed from the housing enabling the housing to be easily mounted on the wall or support in the vicinity of the area to be monitored by the intrusion detector.

The use of readily interchangeable, flexible lenses makes it possible to rapidly change the viewing distance and field of a detector. This permits an installer, for example, to stock fewer units while retaining the capability of protecting areas of diverse size and atmospheric conditions.

In addition, a visible light source is provided with a movable mirror adapted to be positioned between the infrared detector and the light source so that the light source and detector are positioned at conjugate points about the movable mirror. Thus, in setting up the intrusion detector, the mirror is moved in position and the light is reflected off of the mirror illuminating the same field of view which will be seen by the detector. The device is then aimed, the mirror removed and the system is ready to operate.

Since other changes and modifications varied to fit particular operating requirements and environments will be apparent to those skilled in the art, the invention is not considered limited to the examples chosen for purposes of illustration, and covers all changes and modifications which do not constitute a departure from the true spirit and scope of this invention.

What is claimed is:

1. An intrusion detector comprising:
a housing having an opening therein;
an infrared transparent window closing said opening;
a chassis mounted in said housing for rotation about a first axis;
an infrared sensor carried by said chassis;
a visible light source carried by said chassis;
a truncated, substantially conical enclosure mounted in said chassis and pivoted about a second axis substantially normal to said first axis, the open small end of said enclosure surrounding said sensor and light source, the open large end of said enclosure being adjacent said window;
a flexible Fresnel lens supported over the open large end of said enclosure with its focal point positioned substantially on one of said sensor and source; and
mirror means positionable between said sensor and source such that said sensor and source are at conjugate points on opposite sides of said mirror.

2. The detector of claim 1 wherein said mirror means is movable into and out of position between said sensor and source.

3. The detector of claim 2 wherein said mirror is pivoted and actuated by a push-pull wire.

4. The detector of claims 1, 2, or 3 wherein said enclosure includes projections around its open large end and said lens defines openings around its periphery engageable with said projections.

5. In an intrusion detector of the type having an infrared sensor, optical means for focusing radiation from a field of view onto said sensor, and alarm means actuatable by said sensor, the improvement comprising:
a generally C-shaped housing having a back and generally parallel top and bottom members extending therefrom;
a chassis mounted between said top and bottom members for rotation about a first axis, said sensor and optical means being carried by said chassis;
a bendable, translucent cover mounted between the top and bottom members of said housing and defining openings in opposite ends thereof;
said housing having projections on opposite sides thereof adapted to engage the openings of said cover to mount it on said housing with said projections extending into said openings;
said cover being released by applying thumb pressure to said cover in the proximity of said projections.

6. The intrusion detector set forth in claim 5 wherein said chassis is U-shaped with the legs of the chassis having outwardly extending projections thereon,
said top and bottom members of said housing having wells therein adapted to receive and frictionally engage the outwardly extending projections on said chassis for mounting said chassis in said housing;
one of said wells in said housing having a semicircular, arcuate groove spaced therefrom;
one of the legs of said chassis having a cooperating projection adapted to fit in said semicircular groove when said intrusion detector is mounted in said housing for providing a path of rotation for said intrusion detector in said housing for permitting the lateral aiming of said intrusion detector over the path of said semicircular groove.

7. The intrusion detector set forth in claim 6 wherein at least one of the legs on said U-shaped chassis has a slot therein adapted to receive a tool whereby the chassis may be released from said housing by inserting the tool in said slot.

8. The intrusion detector set forth in claims 6 or 7 wherein said U-shaped chassis has a horn-like enclosure mounted thereon with said sensor being mounted on said chassis and centrally positioned in said enclosure;
a plurality of lens mounting projections extending outwardly from the open face of said enclosure;
a flexible lens mountable on the open face of said enclosure by openings on its margins receiving said projections when said lens is mounted on said enclosure;
said lens being readily removed from said enclosure by lifting said flexible lens to release the openings from said projections.

9. The intrusion detector set forth in claim 5 comprising: a light source; a movable mirror having a first position between said light source and said sensor which obscures the sensor from its field of view and reflects light from said light source onto said field of view and a second position removed from blocking said sensor, whereby said mirror can selectively expose the field of view of the intrusion detector to the light source or the sensor to thereby aim the intrusion detector.

10. The intrusion detector set forth in claim 9 further comprising: a cable having a push-pull actuator which, when pulled, protrudes beyond the normal perimeter of said cover when said cover is mounted on said housing;
said cable being coupled to said movable mirror for moving said mirror;
said cover automatically pushing said actuator in when said cover is properly mounted on said housing to insure that said mirror is in the proper position in said housing when said cover is mounted thereon.

11. The passive intrusion detector set forth in claim 5 further comprising: a tamper switch which normally is maintained in a first condition by said cover when said cover is mounted on said housing and is released to a second condition when said cover is removed; and a tamper switch latch for holding said tamper switch in said first condition with said cover removed to facilitate testing of said intrusion detector.

12. The passive intrusion detector set forth in claim 11 including a gain change circuit coupled to said tamper switch,
said gain change circuit including means for changing the gain of said circuit when said cover is removed in response to said tamper switch.

13. In an intrusion detector of the type having a radiation sensor, optical means for applying radiation from a field of view onto said sensor, and an alarm actuatable by said sensor all being mounting in a housing, the improvement comprising:

a removable window mounted on said housing, a gain change circuit having two gain operating levels, switch means coupled to said gain change circuit, said switch means being actuatable by the removal and replacement of said window in said housing whereby the gain is reduced when the window is removed in response to said switch means.

14. In the intrusion detector set forth in claim 13 in which the reduction in gain produced by said gain change circuit in response to said switch means corresponds to the attenuation provided by said window to radiation applied to the intrusion detector.

15. In the intrusion detector set forth in claim 13 having latch means for holding said switch means in a position providing full gain with said window removed.

* * * * *

UNITED STATES PATENT AND TRADEMARK OFFICE
CERTIFICATE OF CORRECTION

PATENT NO. : 4,447,726
DATED : May 8, 1984
INVENTOR(S) : Mudge et al.

It is certified that error appears in the above—identified patent and that said Letters Patent is hereby corrected as shown below:

First page, add to Item 56, --4,275,303 6/1981 Mudge 250/342--;
Column 1, line 50, "or view" should read --of view--;
Column 2, line 55, after "housing" insert --broken--;
Column 5, line 3, after "detector" insert --in--;
Column 9, line 1, "mounting" should read --mounted--;
Column 10, line 3, "In the" should read --The--;
Column 10, line 8, "In the" should read --The--.

Signed and Sealed this

*Twenty-sixth* Day of *February 1985*

[SEAL]

*Attest:*

DONALD J. QUIGG

*Attesting Officer* *Acting Commissioner of Patents and Trademarks*